Jan. 1, 1935.  L. L. LUDINGTON  1,986,587
METHOD OF SECTIONALIZING TUBES
Original Filed April 8, 1932
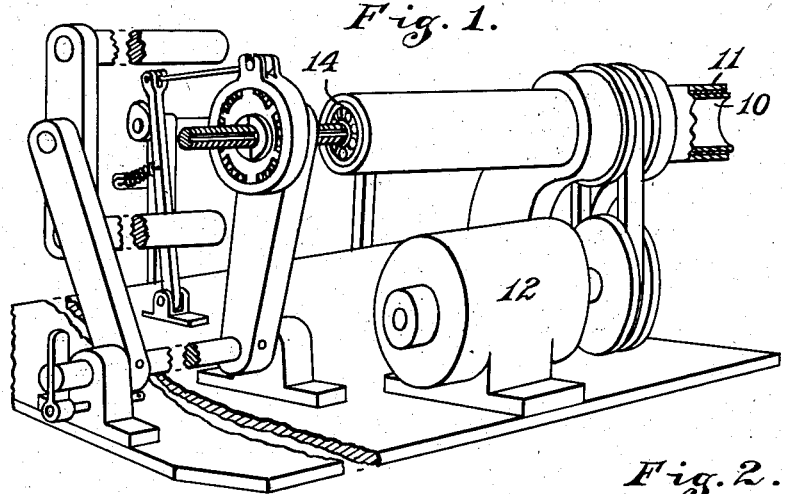
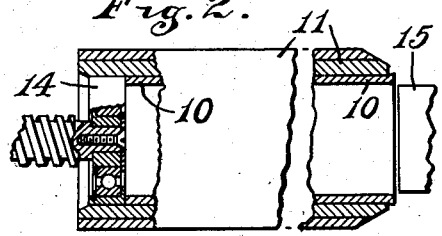
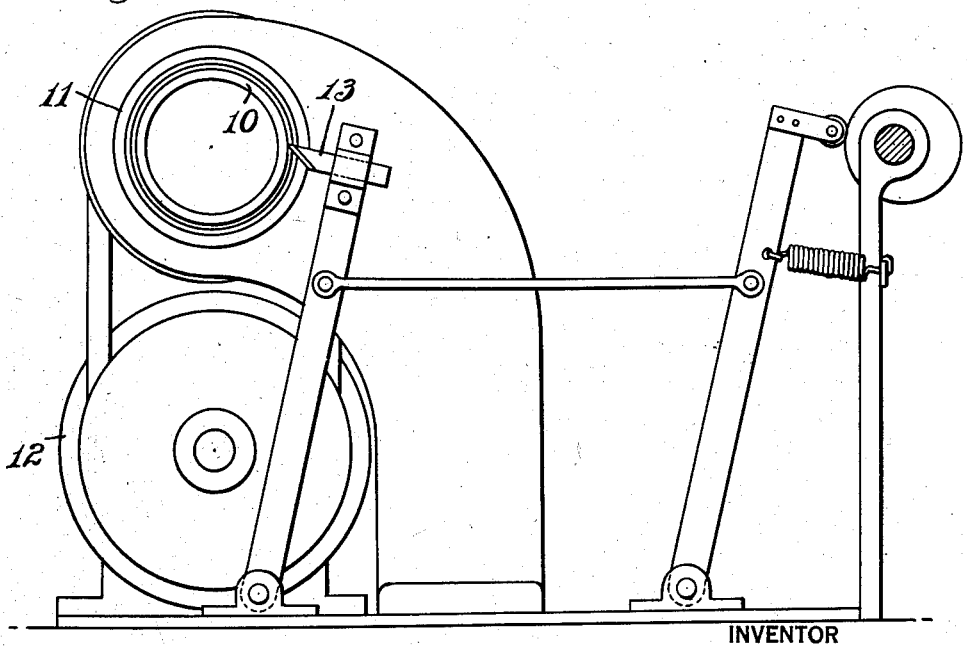
INVENTOR
Lawrence L. Ludington,
BY
Hood & Hahn
ATTORNEYS Patented Jan. 1, 1935

1,986,587

UNITED STATES PATENT OFFICE 1,986,587

METHOD OF SECTIONALIZING TUBES

Lawrence L. Ludington, Muncie, Ind., assignor to Ball Brothers Company, Muncie, Ind., a corporation of Indiana Original application April 8, 1932, Serial No. 604,051. Divided and this application September 28, 1934, Serial No. 745,922

5 Claims. (Cl. 164—69)

My invention relates to a new method of treating expansible tubes whereby axial sections may be separated therefrom.

The present application is a division from my copending application, Serial Number 604,051 filed April 8, 1932.

The accompanying drawing illustrates my invention:

Fig. 1 is a perspective view, largely diagramatic and in partial vertical section, of mechanism used in the practice of my method;

Fig. 2 is an axial section of the rotating carrier and enclosed expansible tube to be operated upon; and Fig. 3 is a diagrammatic elevation of tube severing means.

My new method involves the radial expansion by centrifugal force of the tube to be operated upon and the subsequent severance of a desired axial length while the tube is under stress of said centrifugal force.

In the practice of my method, the expansible tube 10, say of rubber gasket-forming material, is placed within a rotatable tubular carrier 11 the internal diameter of which is slightly greater than the normal external diameter of the tube 10, with one end of tube 10, to the desired severing length, protruded from carrier tube 11. Thereupon the carrier tube 11 is rotated, by any suitable means such as motor 12, at a speed sufficient to cause tube 10 to radially expand into tube 11, thereby creating sufficient frictional contact between the exterior of tube 10 and the interior of carrier tube 11 to partake of the rotary speed of tube 11 and to resist the necessary severing force applied to tube 10.

Thereupon a suitable severing force, as by means of the cutter 13, is applied radially to tube 10 at the desired point in its length to sever an axial length from tube 10.

Thereupon tube 10 is axially advanced in carrier tube 11, as by means of plunger 14, and the severing operation repeated.

Rotation of tube 10 during the severing operation causes its protruding end to expand, and, as the severance is completed, by the cutter 13, the combined centrifugal forces acting within the severed portion and the axial component of the knife force, cause the severed whirling portion of the tube 10 to jump axially away from the carrier tube 11 so that the severed portion of tube 10 may be caught upon an appropriately placed receiver 15 by which it will be caught and held, the said severed portion contracting thereon as rotation ceases.

I claim as my invention:

1. The method of forming annular sections which comprises telescoping a tube of expansible material within a carrier tube rotatable about its axis, rotating said two tubes simultaneously about the tube axes at an angular velocity sufficient to cause the expansible tube to centrifugally swell into the carrier tube, and thereupon severing an axial section from said expansible tube while said tube is centrifugally stressed.

2. The method of forming annular sections which comprises telescoping a tube of expansible material within a carrier tube rotatable about its axis, rotating said two tubes simultaneously about the tube axes at an angular velocity sufficient to cause the expansible tube to centrifugally swell into the carrier tube, and traversing a cutter through the wall of the expansible tube.

3. A method of forming annular sections which comprises telescoping a tube of expansible material within a carrier tube rotatable about its axis, rotating said two tubes simultaneously about the tube axes at an angular velocity sufficient to cause the expansible tube to centrifugally swell into the rotary tube, and alternately axially projecting an end of the expansible tube from the carrier tube and traversing a cutter through the wall of the projected portion of the expansible tube.

4. The method of forming annular sections which comprises telescoping a tube of expansible material within a carrier tube rotatable about its axis, rotating said two tubes simultaneously about the tube axes at an angular velocity sufficient to cause the expansible tube to centrifugally swell into the carrier tube, traversing a cutter through the wall of the flexible tube at the mouth of the carrier tube, and aligning a receiving element with the projected end of the flexible tube prior to cutter traverse, in the path of projection of the severed section.

5. The method of forming annular sections which comprises telescoping a tube of expansible material within a carrier tube rotatable about its axis, rotating said two tubes simultaneously about the tube axes at an angular velocity sufficient to cause the expansible tube to centrifugally swell into the carrier tube, alternately axially projecting an end of the expansible tube from the carrier tube and traversing a cutter through the wall of the projected portion of the expansible tube, and aligning a receiving element with the projected end of the flexible tube prior to cutter traverse, in the path of projection of the severed section.

LAWRENCE L. LUDINGTON.